(12) United States Patent
Gao et al.

(10) Patent No.: US 11,422,909 B2
(45) Date of Patent: Aug. 23, 2022

(54) METHOD, DEVICE, AND STORAGE MEDIUM FOR MANAGING STRIPE IN STORAGE SYSTEM

(71) Applicant: EMC IP Holding Company LLC, Hopkinton, MA (US)

(72) Inventors: Jian Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 210 days.

(21) Appl. No.: 16/990,222

(22) Filed: Aug. 11, 2020

(65) Prior Publication Data

US 2021/0334183 A1 Oct. 28, 2021

(30) Foreign Application Priority Data

Apr. 24, 2020 (CN) .......................... 202010334253.8

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0644* (2013.01); *G06F 3/0689* (2013.01); *G06F 2201/82* (2013.01)

(58) Field of Classification Search
CPC .. G06F 11/2094; G06F 3/0619; G06F 3/0644; G06F 3/0689
USPC ...................................................... 714/6.24
See application file for complete search history.

(56) References Cited

U.S. PATENT DOCUMENTS

| 8,601,311 | B2 * | 12/2013 | Horn ..................... | G06F 11/108 |
| | | | | 714/6.24 |
| 8,812,902 | B2 | 8/2014 | Deepak | |
| 8,839,028 | B1 | 9/2014 | Polia et al. | |
| 11,150,989 | B2 | 10/2021 | Gao et al. | |
| 2003/0237019 | A1 * | 12/2003 | Kleiman ............ | G06F 11/1092 |
| | | | | 714/E11.088 |
| 2017/0270018 | A1 | 9/2017 | Xiao et al. | |
| 2019/0310916 | A1 * | 10/2019 | Patel ..................... | G06F 3/0619 |
| 2019/0332479 | A1 * | 10/2019 | Gao .................... | G06F 11/1092 |
| 2020/0133810 | A1 * | 4/2020 | Gao ....................... | G06F 3/0659 |
| 2021/0173742 | A1 * | 6/2021 | Zhuo ................... | G06F 11/1092 |

* cited by examiner

*Primary Examiner* — Chae M Ko
(74) *Attorney, Agent, or Firm* — BainwoodHuang

(57) ABSTRACT

When managing stripes in a storage system, based on a determination that a failed storage device appears in first storage devices, a failed stripe involving the failed storage device is determined in a first redundant array of independent disks (RAID). An idle space that can be used to reconstruct the failed stripe is determined in the first storage devices. The failed stripe is reconstructed to second storage devices in the storage system based on a determination that the idle space is insufficient to reconstruct the failed stripe, the second storage devices being storage devices in a second RAID. An extent in the failed stripe is released in the first storage devices. Accordingly, it is possible to reconstruct a failed stripe as soon as possible to avoid data loss, and further to provide more idle spaces in the first storage devices for future reconstruction.

20 Claims, 10 Drawing Sheets

METHOD, DEVICE, AND STORAGE MEDIUM FOR MANAGING STRIPE IN STORAGE SYSTEM

CROSS-REFERENCE TO RELATED APPLICATION

This application claims priority to Chinese Patent Application No. CN202010334253.8, on file at the China National Intellectual Property Administration (CNIPA), having a filing date of Apr. 24, 2020, and having "METHOD, DEVICE, AND STORAGE MEDIUM FOR MANAGING STRIPE IN STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for managing stripes in a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and storage system response time. At present, various data storage systems based on Redundant Array of Independent Disks (RAIDs) have been developed to improve data reliability. When one or more storage devices in a storage system fail, data in the failed storage devices can be recovered from data on other normally operating storage devices.

A mapped RAID has been developed at present. In this mapped RAID, storage device is a logical concept and can include a plurality of extents. A plurality of extents included in a logical storage device can be distributed on different physical storage devices in a resource pool. For a plurality of extents in one stripe of the mapped RAID, the plurality of extents should be distributed on different physical storage devices, so that when a physical storage device where one of the plurality of extents is located fails, a reconstruction operation may be performed to recover data from physical storage devices where other extents are located.

It will be understood that, in order to ensure that, when a storage device in the resource pool fails, data in the failed storage device can be quickly reconstructed to an idle storage space in the resource pool, it is usually necessary to set a reserved idle part in each storage device in the resource pool. However, during the operation of a storage system, the reserved idle parts may be depleted. This will result in the inability to perform the reconstruction operation when a failed storage device appears in the storage system. In this case, how to manage a failed stripe in a storage device in a more effective manner becomes a hotspot of research.

SUMMARY OF THE INVENTION

Therefore, it is desirable to develop and implement a technical solution for managing a storage system in a more effective manner. It is desirable that the technical solution can be compatible with existing storage systems, and by modifying various configurations of existing storage systems, can manage failed stripes in the storage system in a more effective manner.

According to a first aspect of the present disclosure, a method for managing stripes in a storage system is provided. In the method, based on a determination that a failed storage device appears in a first set of storage devices in the storage system, a failed stripe involving the failed storage device is determined, the first set of storage devices being storage devices in a first redundant array of independent disks. An idle space that can be used to reconstruct the failed stripe is determined in the first set of storage devices. The failed stripe is reconstructed to a second set of storage devices in the storage system based on a determination that the idle space is insufficient to reconstruct the failed stripe, the second set of storage devices being storage devices in a second redundant array of independent disks. An extent in the failed stripe is released in the first set of storage devices.

According to a second aspect of the present disclosure, an electronic device is provided, including: at least one processor; and a memory coupled to the at least one processor and having instructions stored thereon, wherein the instructions, when executed by the at least one processor, cause the electronic device to perform actions for managing stripes in a storage system. The actions include: based on a determination that a failed storage device appears in a first set of storage devices in the storage system, determining a failed stripe involving the failed storage device, the first set of storage devices being storage devices in a first redundant array of independent disks; determining, in the first set of storage devices, an idle space that can be used to reconstruct the failed stripe; reconstructing the failed stripe to a second set of storage devices in the storage system based on a determination that the idle space is insufficient to reconstruct the failed stripe, the second set of storage devices being storage devices in a second redundant array of independent disks; and releasing an extent in the failed stripe in the first set of storage devices.

According to a third aspect of the present disclosure, a computer program product is provided. The computer program product is tangibly stored on a non-transitory computer-readable medium and containing machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of example but not limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although preferred implementations of the present disclosure are shown in the accompanying drawings, it should be understood that the present disclosure can be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "including" and variations thereof mean open inclusion, i.e., "including but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," and the like may refer to different or the same objects. Other explicit and implicit definitions may also be included below. In the context of the present disclosure, a storage system may be an RAID-based storage system. The RAID-based storage system may combine a plurality of storage devices into one disk array. By providing redundant storage devices, the reliability of an entire disk group may greatly exceed that of a single storage device. RAID may provide various advantages over a single storage device, such as enhanced data integration, enhanced fault tolerance, increased throughput or capacity, and so on. There are a plurality of standards for RAID, such as RAID-1, RAID-2, RAID-3, RAID-4, RAID-5, RAID-6, RAID-10, RAID-50, and so on.

Figure 1A:
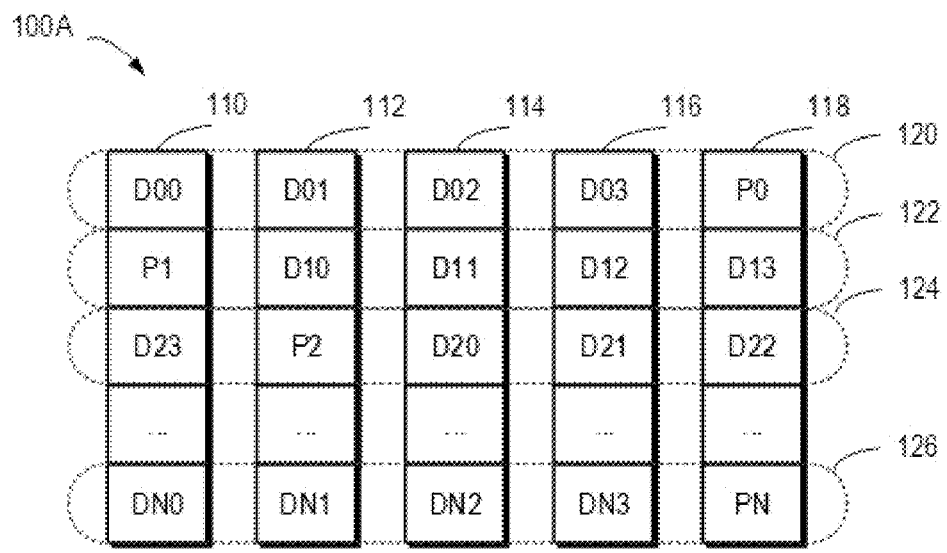
FIGS. 1A and 1B respectively schematically show block diagrams of a storage system in which implementations of the present disclosure may be implemented.

FIG. 1A schematically shows a schematic diagram of storage system 100A in which a method of the present disclosure may be implemented. In the storage system shown in FIG. 1A, RAID-5 (4D+1P, where 4D indicates that the storage system includes four storage devices for storing data, and 1P indicates that the storage system includes one storage device for storing a P parity) array including five independent storage devices (110, 112, 114, 116, and 118) is used as an example to illustrate the working principle of RAID. It should be noted that although five storage devices are schematically shown in FIG. 1A, more or fewer storage devices may also be included in other implementations depending on different RAID levels. Although stripes 120, 122, 124, . . . , 126 are shown in FIG. 1A, an RAID system may also include different numbers of stripes in other examples.

In RAID, a stripe may span a plurality of physical storage devices (e.g., stripe 120 spans storage devices 110, 112, 114, 116, and 118). Stripe may be simply understood as a storage area that satisfies a certain address range in the plurality of storage devices. Data stored in stripe 120 includes a plurality of parts: data block D00 stored on storage device 110, data block D01 stored on storage device 112, data block D02 stored on storage device 114, data block D03 stored on storage device 116, and data block PO stored on storage device 118. In this example, data blocks D00, D01, D02, and D03 are stored data, and data block PO is the P parity of the stored data.

The manner in which data is stored in other stripes 122 and 124 is also similar to that in stripe 120, except that parities related to other data blocks may be stored on a storage device different from storage device 118. In this way, when one of storage devices 110, 112, 114, 116, and 118 fails, the data in the failed device may be recovered from other normal storage devices.

Figure 1B:
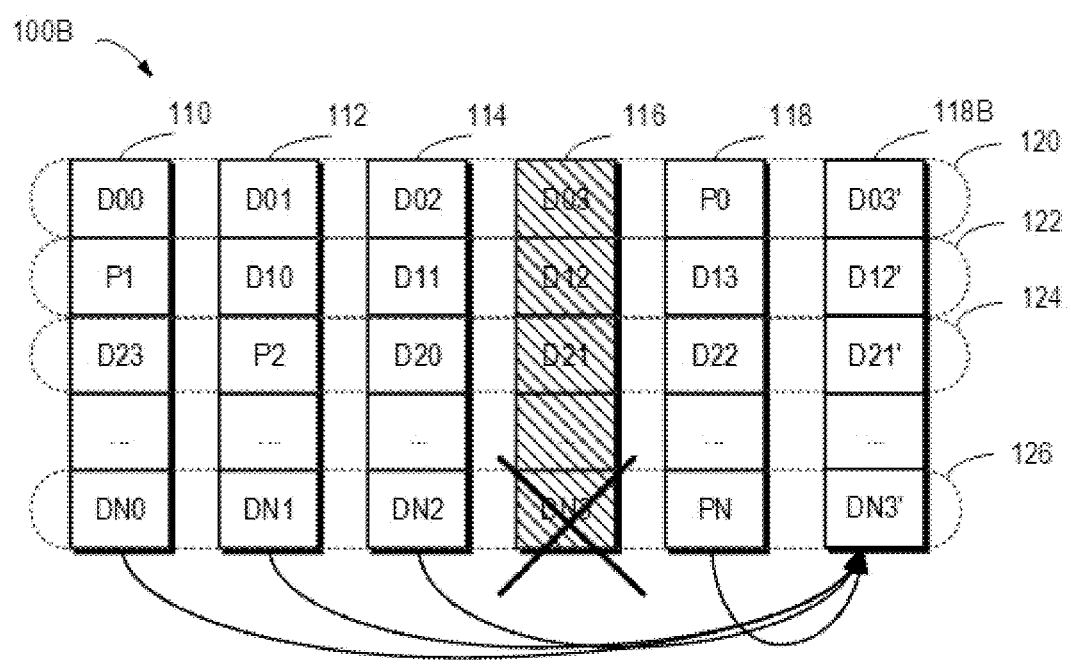

FIG. 1B schematically shows schematic diagram 100B of a reconstruction process of storage system 110A. As shown in FIG. 1B, when one storage device (for example, storage device 116 shown in hatching) fails, data may be recovered from a plurality of remaining storage devices 110, 112, 114, and 118 that operate normally. In this case, new backup storage device 118B may be added into RAID to replace storage device 118. In this way, the recovered data may be written to 118B and the system may be reconstructed.

It should be noted that although a RAID-5 storage system including five storage devices (four storage devices for storing data and one storage device for storing the parity) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of a triple-parity RAID, three storage devices may be used to store parities P, Q, and R respectively.

Figure 2:
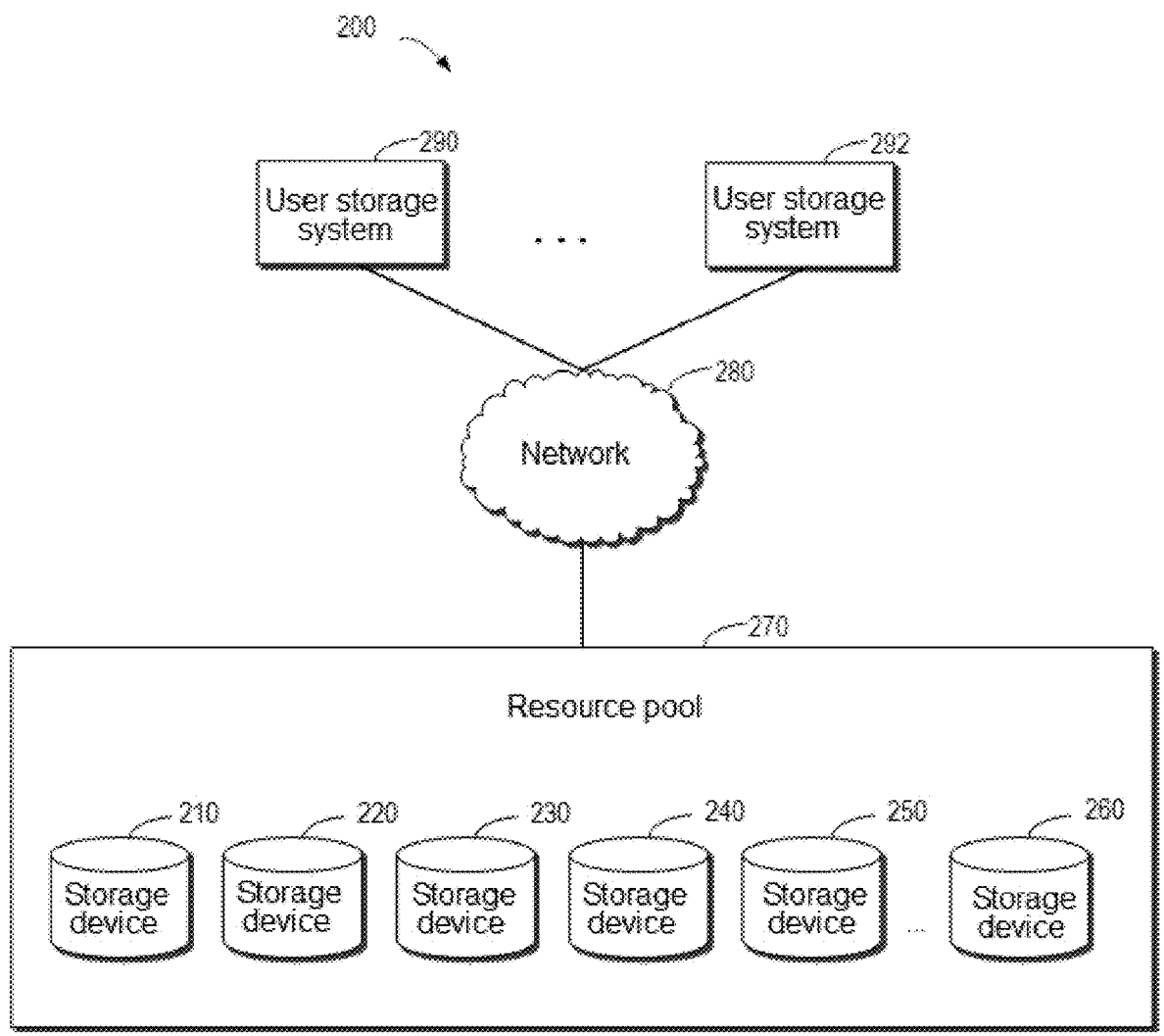
FIG. 2 schematically shows a block diagram of an example environment in which implementations of the present disclosure may be implemented.
Figure 3:
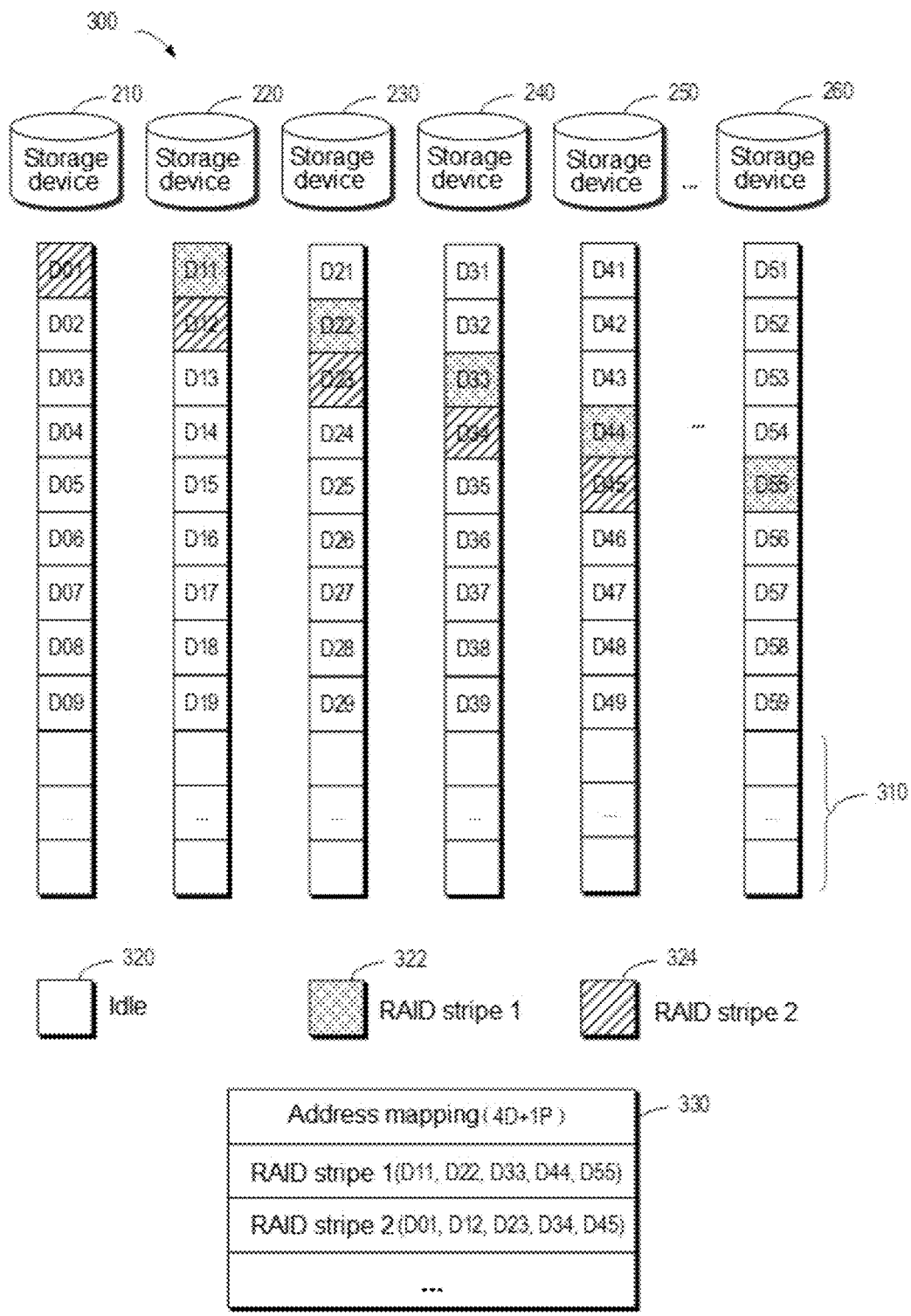
FIG. 3 schematically shows a diagram of a storage resource pool in FIG. 2.

With the development of distributed storage technologies, storage devices 110, 112, 114, 116, and 118 in the storage system shown in FIGS. 1A and 1B may no longer be limited to physical storage devices, but may be virtual storage devices. For example, extents on storage device 110 may respectively come from different physical storage devices (simply referred to as storage devices hereinafter) in a resource pool. FIG. 2 schematically shows block diagram 200 of an example environment in which a method of the present disclosure may be implemented. As shown in FIG. 2, storage resource pool 270 may include a plurality of physical storage devices 210, 220, 230, 240, 250, ..., 260. In this case, storage spaces in the plurality of storage devices may be allocated to a plurality of user storage systems 290, ..., 292. In this case, user storage systems 290, ..., 292 may access the storage spaces in the storage devices in storage resource pool 270 via network 280. FIG. 3 schematically shows a diagram of more information of storage resource pool 270 as shown in FIG. 2. Resource pool 270 may include a plurality of storage devices 210, 220, 230, 240, 250, ..., 260. Each storage device may include a plurality of extents, where legend 320 indicates an idle extent, legend 322 indicates an extent for RAID stripe 1 of storage system 110A in FIG. 1, and legend 324 indicates an extent for RAID stripe 2 of storage system 110A in FIG. 1. In this case, extents D11, D22, D33, and D44 for RAID stripe 1 are used to store data blocks of the stripe respectively, and extent D55 is used to store a parity of data. Extents D01, D12, D23, and D34 for RAID stripe 2 are used to store data blocks of the second stripe respectively, and extent D45 is used to store a parity of data.

As shown in FIG. 3, address mapping 330 shows an association relationship between stripes and addresses where the extents in the stripes are located. For example, RAID stripe 1 may include five extents: D11, D22, D33, D44, and D55, and these five extents are located in storage devices 210, 220, 230, 240, and 250 respectively. Specifically, as shown in FIG. 3, extent D11 is the first extent in storage device 220, and extent D22 is the second extent in storage device 230. As shown in FIG. 3, there may also be reserved idle part 310 in each storage device, so that when one storage device in the resource pool fails, extents in idle part 310 in each storage device may be selected to reconstruct the extents in the failed storage device.

It should be noted that FIG. 3 only uses the 4D+1P RAID-5 storage system as an example to show how the extents in the stripes are distributed in the plurality of storage systems in the resource pool. When other RAID levels are adopted, those skilled in the art can implement specific details based on the above principles. For example, in a 6D+1P+1Q RAID-6 storage system, eight extents in each stripe may be distributed on a plurality of storage devices, thereby ensuring load balance of the plurality of storage devices. For convenience of description, only a 4D+1P storage system is taken as a specific example hereinafter to describe how to manage stripes in a storage system. When a storage system has other RAID levels, stripes in the storage system can be managed in a similar manner.

It will be understood that, in order to ensure that when a storage system fails, data in an extent of the failed storage device can be recovered to a normal storage device in time, reserved idle part 310 can be set in each storage device. However, with the operation of the storage system, reserved idle part 310 may be depleted, which results in the inability to perform data reconstruction when there is no idle space in the storage system. In this case, when more failed storage devices appear in the storage system, unrecoverable data loss will be caused.

Figure 4:
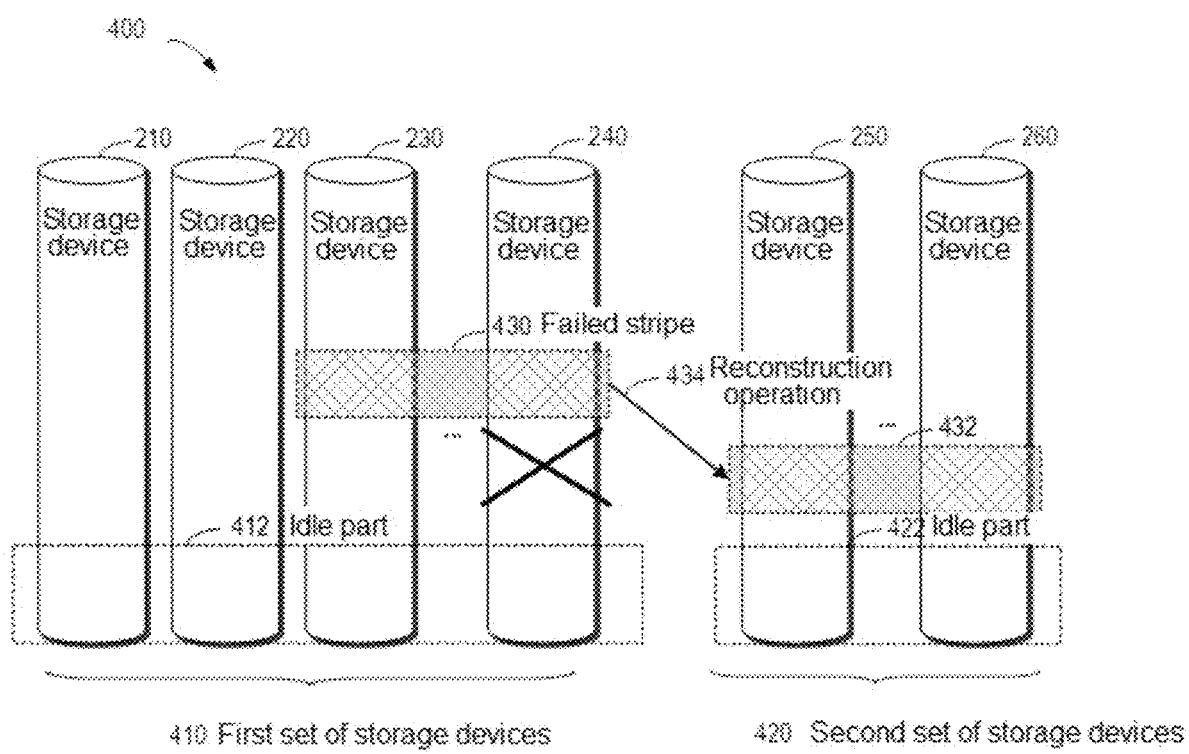
FIG. 4 schematically shows a block diagram of a process for managing stripes in a storage system in which implementations of the present disclosure may be implemented.

In order to address the above-mentioned defects, implementations of the present disclosure provide a method, a device, and a computer program product for managing stripes in a storage system. Hereinafter, a summary of an example implementation of the present disclosure is described with reference to FIG. 4. FIG. 4 schematically shows block diagram 400 of a process for managing stripes in a storage system in which implementations of the present disclosure may be implemented. It will be understood that, for management complexity reasons, a plurality of storage devices in a resource pool can be divided into a plurality of sets. For example, a first set of storage devices 410 may include storage devices 210, 220, 230, ..., and 240, and a second set of storage devices 420 may include storage devices 250, ..., and 260. Here, a set of storage devices may be used to construct a redundant array of independent disks. The number of devices in each set of storage devices can be limited, and the maximum value of the number of devices in a set of storage devices is usually set to 25.

As shown in FIG. 4, reference numerals 412 and 422 show the reserved idle parts in the first set of storage devices 410 and the second set of storage devices 420 respectively. With the operation of the storage system, idle part 412 in the first set of storage devices 410 may be depleted. In this case, the reconstruction operation cannot be performed when storage device 240 fails.

According to an example implementation of the present disclosure, it is proposed to use an idle space in another set of storage devices as a reconstruction destination of failed stripe 430. As shown in FIG. 4, the idle space in the second set of storage devices 420 may be used as a reconstruction destination. For example, idle space 432 may be selected from the second set of storage devices 250, ..., and 260 respectively to perform reconstruction. It will be understood that although idle space 432 shown in FIG. 4 is located outside reserved idle part 422, according to an example implementation of the present disclosure, idle space 432 may be selected from idle part 422 as a reconstruction destination. Specifically, as indicated by arrow 434, data in failed stripe 430 may be reconstructed to idle space 432. With an example implementation of the present disclosure, a reconstruction operation may be performed when there is no idle space in the first set of storage systems 410. In this way, the data in failed stripe 430 can be reconstructed as soon as possible to avoid data loss.

Further, the extent occupied by failed stripe 430 may be released after the data in failed stripe 430 has been reconstructed to idle space 432. In this case, idle spaces will appear in the first set of storage devices 410, and these idle spaces can be used to reconstruct other failed stripes. Compared with existing technical solutions which need to replace failed storage device 240 immediately, an example implementation of the present disclosure may quickly address, in a more convenient and effective manner, the problem of lack of idle spaces in the first set of storage devices and may thus continue to perform a reconstruction operation.

Figure 5:
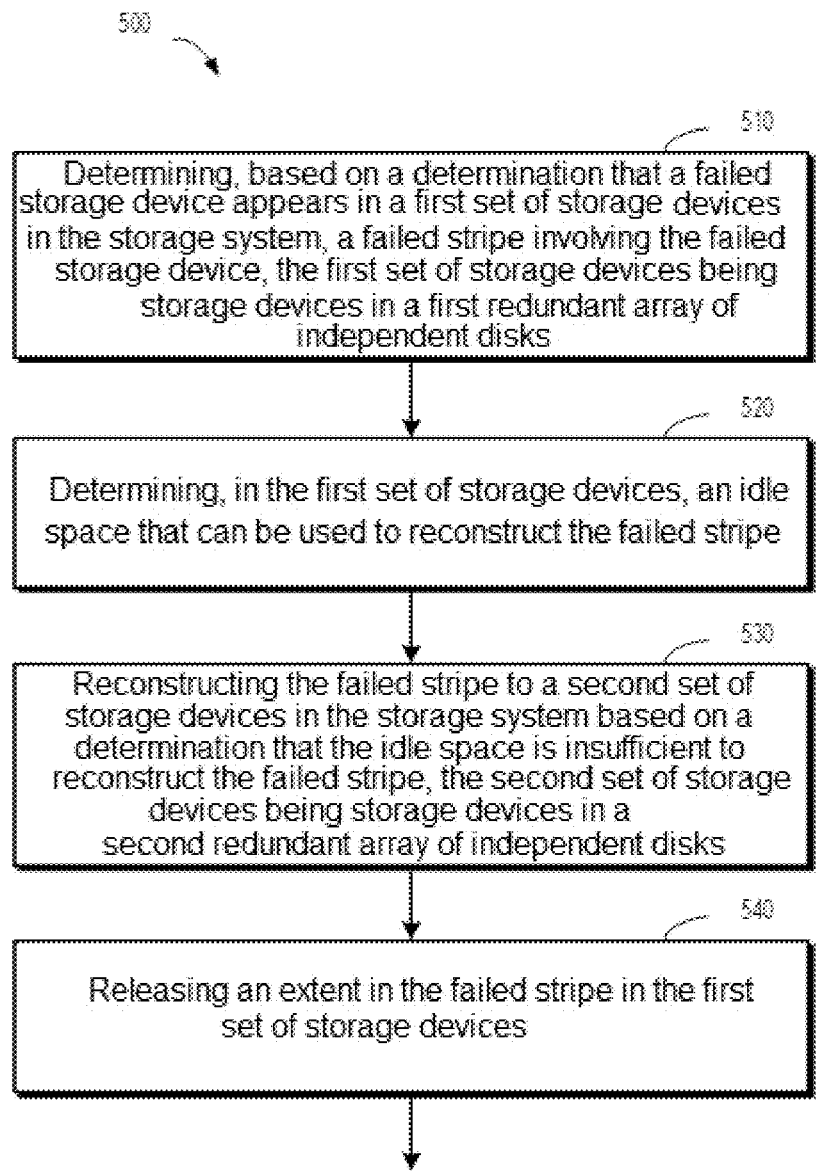
FIG. 5 schematically shows a flow chart of a method for managing stripes in a storage system according to one implementation of the present disclosure.

Hereinafter, more details will be described with reference to FIG. 5. FIG. 5 schematically shows a flow chart of method 500 for managing stripes in a storage system according to one implementation of the present disclosure. At block 510, based on a determination that failed storage device 240 appears in a first set of storage devices 410 in the storage system, failed stripe 430 involving failed storage device 240 is determined. Here, the first set of storage devices 410 are storage devices in a first redundant array of independent disks.

According to an example implementation of the present disclosure, failed stripe 430 may be determined based on the type of an extent included in failed storage device 240. It will be understood that the storage system may include two types of stripes: a user data type and a metadata type. Here, the user data type indicates that the stripe stores user data of a user from the storage system. For security reasons, user data may be stored using a 4D+1P manner or other manners. The metadata type indicates that the stripe stores metadata of user data. It will be understood that metadata may include attribute information about user data, such as type, owner, time of creation, and so on. Therefore, metadata may be stored in a more secure and reliable manner. For example, metadata may be stored based on a 1D+1D+1D manner. In this case, there will be three identical copies of the metadata to provide higher security and reliability.

According to an example implementation of the present disclosure, since the metadata is of higher importance, a failed stripe that stores metadata may be reconstructed preferentially. Specifically, it is possible to look up a metadata extent of the metadata type in a plurality of extents of failed storage device 240, and identify a stripe where the metadata extent is located as failed stripe 430.

According to an example implementation of the present disclosure, it is possible to traverse each extent in failed storage device 240 and determine the type of the extent, so as to find all metadata extents of the metadata type. Alternatively and/or additionally, it is also possible to look up in address mapping of the first set of storage devices 410 a metadata stripe that stores metadata, and identify the metadata stripe involving failed storage device 240 as failed stripe 430.

With an example implementation of the present disclosure, the found failed stripe 430 storing metadata may be first reconstructed to the second set of storage devices 420. In this way, it can be ensured that more protection is provided to metadata preferentially, so as to improve the overall data security of the first set of storage devices 410.

According to an example implementation of the present disclosure, user data can be processed after all metadata in failed storage device 240 has been found. Specifically, it is possible to look up a user data extent of the user data type in a plurality of extents of failed storage device 240, and identify a stripe where the user data extent is located as failed stripe 430. With an example implementation of the present disclosure, all failed stripes in failed storage device 240 may be found successively in a descending order of the importance of data.

At block 520, an idle space that can be used to reconstruct the failed stripe is determined in the first set of storage devices. It will be understood that based on the principle of RAID, the extent used as a reconstruction destination should be located on any storage device different from those involved in the failed stripe. Therefore, when determining an idle space, it should be ensured that the idle extent may not be located in any storage device involved in the failed stripe.

It will be understood that different types of storage devices may have different access speeds, and the first set of storage devices 410 may include different types of storage devices. For example, the device type may include a hard disk drive type, a solid-state drive type, etc. When constructing a stripe, all storage devices in one stripe should have the same device type. Therefore, when determining an idle space that is used as a reconstruction destination, the type of the storage device should also be considered.

Specifically, the device type of a plurality of storage devices where the failed stripe is located may be determined. Assuming that the type of failed storage device 240 is the solid-state drive type, then an idle space can be determined from a plurality of other storage devices of the solid-state drive type that are other than the plurality of storage devices in the first set of storage devices 410. In other words, the idle space determined here should satisfy two conditions: (1) the device type of a device where the idle space is located should be the same as that of the failed stripe; and (2) the device where the idle space is located should be different from any storage device involved in the failed stripe. With an example implementation of the present disclosure, by looking up a storage device of the same storage type, it can be ensured that the found reconstruction destination matches the original device type of failed stripe 430 to be reconstructed. In this way, the consistency of the reconstructed stripe with the original stripe can be ensured.

Still referring to FIG. 5, at block 530, failed stripe 430 is reconstructed to the second set of storage devices 420 in the storage system based on a determination that the idle space is insufficient to reconstruct failed stripe 430. Here, the second set of storage devices 420 are storage devices in a second redundant array of independent disks. Specifically, a plurality of storage devices of a specified device type may be first selected from the second set of storage devices 420. A plurality of storage devices of the device type may be selected according to the width of the failed stripe. If the failed stripe is stored based on a 4D+1P manner, five storage devices of which the device type is the solid-state drive type may be selected from the second set of storage devices 420 as the reconstruction destination. With an example implementation of the present disclosure, the consistency of the reconstructed stripe with the original stripe can be ensured.

Figure 6A:
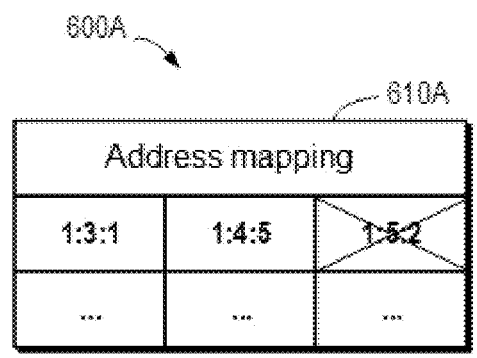
FIG. 6A schematically shows a block diagram of the address mapping of a first set of storage devices and associated with metadata according to one implementation of the present disclosure.

Then, it is possible to reconstruct the failed stripe to a plurality of idle extents respectively located in a plurality of selected storage devices, and update the address mapping of the first set of storage devices 410 based on addresses of the plurality of idle extents. Hereinafter, how to reconstruct failed stripe 430 of a metadata type will be described with reference to FIGS. 6A to 6C respectively. FIG. 6A schematically shows block diagram 600A of address mapping of a first set of storage devices 410 and associated with metadata according to one implementation of the present disclosure.

As shown in FIG. 6A, address mapping 610A records the address mapping relationship of the stripes of the metadata type. Specifically, "X:Y:Z" respectively indicates the position of an extent in a stripe: the Xth set of storage devices, the Yth storage device, and the Zth extent. For example, the address of the first extent is "1:3:1," indicating that the first extent is located in the first extent in the third storage device of the first set of storage devices. Similarly, "1:4:5" indicates that the second extent is located in the fifth extent in the fourth storage device of the first set of storage devices.

Figure 6B:
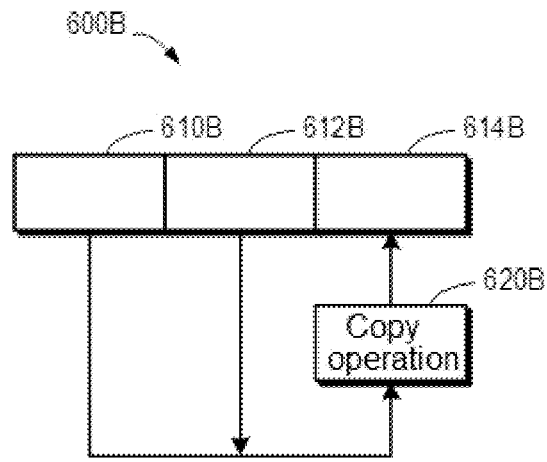
FIG. 6B schematically shows a block diagram of a process for reconstructing a metadata stripe according to one implementation of the present disclosure.

When the fifth storage device in the first set of storage devices 410 fails, the third extent in the stripe is identified as failed extent 430. In this case, it is necessary to select three extents located in three storage devices respectively from the second set of storage devices 420 according to the width of the stripe (the width of a metadata stripe is 3). FIG. 6B schematically shows block diagram 600B of a process for reconstructing a metadata stripe according to one implementation of the present disclosure. As shown in FIG. 6B, extents 610B, 612B, and 614B may be selected from the second set of storage devices 420 as the reconstruction destination.

During the reconstruction operation, an extent that does not fail in failed stripe 430 may be first copied. Specifically, data in a plurality of extents other than the failed extent in failed stripe 430 may be respectively copied to a plurality of idle extents (e.g., extents 610B and 612B) respectively located in a first part of storage devices of a plurality of storage devices. In order to reconstruct the data in failed extent 430, data in the failed extent may be reconstructed to an idle extent in a second part of storage devices of the plurality of storage devices based on the copied data in the first part of storage devices. A metadata stripe is stored based on a 1D+1D+1D manner, and copy operation 620B may be performed based on the data in extents 610B and 612B to reconstruct the data in the failed extent to extent 614B.

Figure 6C:
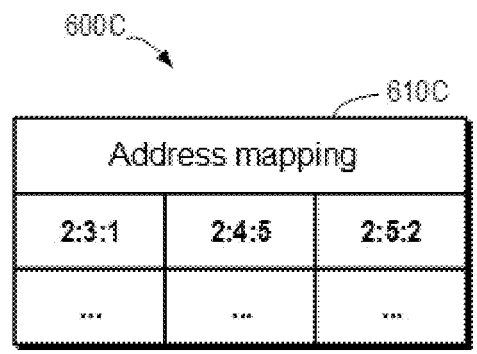
FIG. 6C schematically shows a block diagram of address mapping after reconstruction according to one implementation of the present disclosure.

After the reconstruction operation has been performed, address mapping of the first set of storage devices 410 may be updated using addresses of the extents in the reconstructed stripe, to form an updated address mapping. FIG. 6C schematically shows block diagram 600C of address mapping after reconstruction according to one implementation of the present disclosure. Assuming that addresses of extents 610B, 612B, and 614B are "2:3:1," "2:4:5," and "2:5:2" respectively, the updated address mapping is as shown in address mapping 610C in FIG. 6C.

With an example implementation of the present disclosure, failed stripe 430 in the first set of storage devices 410 may be replaced using a reconstructed stripe in the second set of storage devices 420. When a data access request needs to access data in failed stripe 430, the access request may be directed to the reconstructed stripe in the second set of storage devices 420 based on the updated address mapping 610C. In this way, normal execution of the data access request can be ensured.

Figures 7A, 7B, 7C:
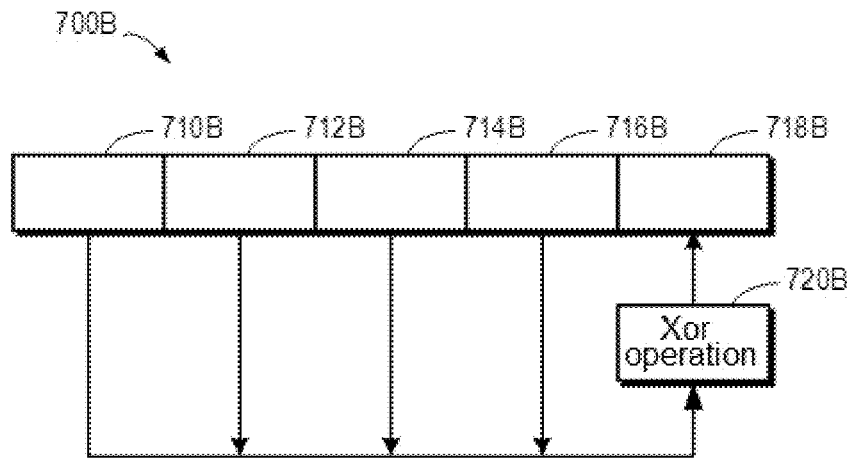
FIG. 7A schematically shows a block diagram of address mapping of a first set of storage devices which is associated with user data according to one implementation of the present disclosure.
FIG. 7B schematically shows a block diagram of a process for reconstructing a user data stripe according to one implementation of the present disclosure.
FIG. 7C schematically shows a block diagram of address mapping after reconstruction according to one implementation of the present disclosure.

Hereinafter, how to reconstruct a failed stripe of a user data type will be described with reference to FIGS. 7A to 7C respectively. FIG. 7A schematically shows block diagram 700A of address mapping 710A of a first set of storage devices 410 and associated with user data according to one implementation of the present disclosure. When the fifth storage device in the first set of storage devices 410 fails, the fifth extent in a stripe is identified as a failed extent. It is necessary to select five extents located in five storage devices respectively from the second set of storage devices 420 according to the width of the stripe (the width of a user data stripe is 5). FIG. 7B schematically shows block diagram 700B of a process for reconstructing a user data stripe according to one implementation of the present disclosure. With reference to FIG. 7B, extents 710B, 712B, 714B, 716B, and 718B may be selected from the second set of storage devices 420 as a reconstruction destination.

During the reconstruction operation, an extent that does not fail in the failed stripe may be first copied. Specifically, data in four extents other than the failed extent may be copied to extents 710B, 712B, 714B, and 716B respectively. A user data stripe is stored based on a 4D+1P manner, and xor operation 720B may be performed based on the data in extents 710B, 712B, 714B, and 716B to reconstruct data in the failed stripe into extent 718B.

After the reconstruction operation has been performed, the address mapping of the first set of storage devices 410 may be updated using positions of the extents in the reconstructed stripe to form an updated address mapping. FIG. 7C schematically shows block diagram 700C of address mapping after reconstruction according to one implementation of the present disclosure, and the updated address mapping is as shown in address mapping 710C in FIG. 7C.

How to perform a reconstruction operation has been described above with reference to FIGS. 6A to 6C and FIGS. 7A to 7C. Hereinafter, further processing after the reconstruction operation will be described by returning to FIG. 5. At block 540 in FIG. 5, an extent in the failed stripe is released in the first set of storage devices 410. It will be understood that the address mapping of the first set of storage devices 410 records whether the extents in the storage devices are allocated and to which stripes they are allocated. The address mapping of the first set of storage devices 410 may be updated to mark an extent in failed stripe 430 as an idle extent. By updating the address mapping, extents in failed stripe 430 that have been reconstructed to the second set of storage devices 420 may be marked as available. In this way, these extents may be used to reconstruct other failed stripes.

Figure 8:
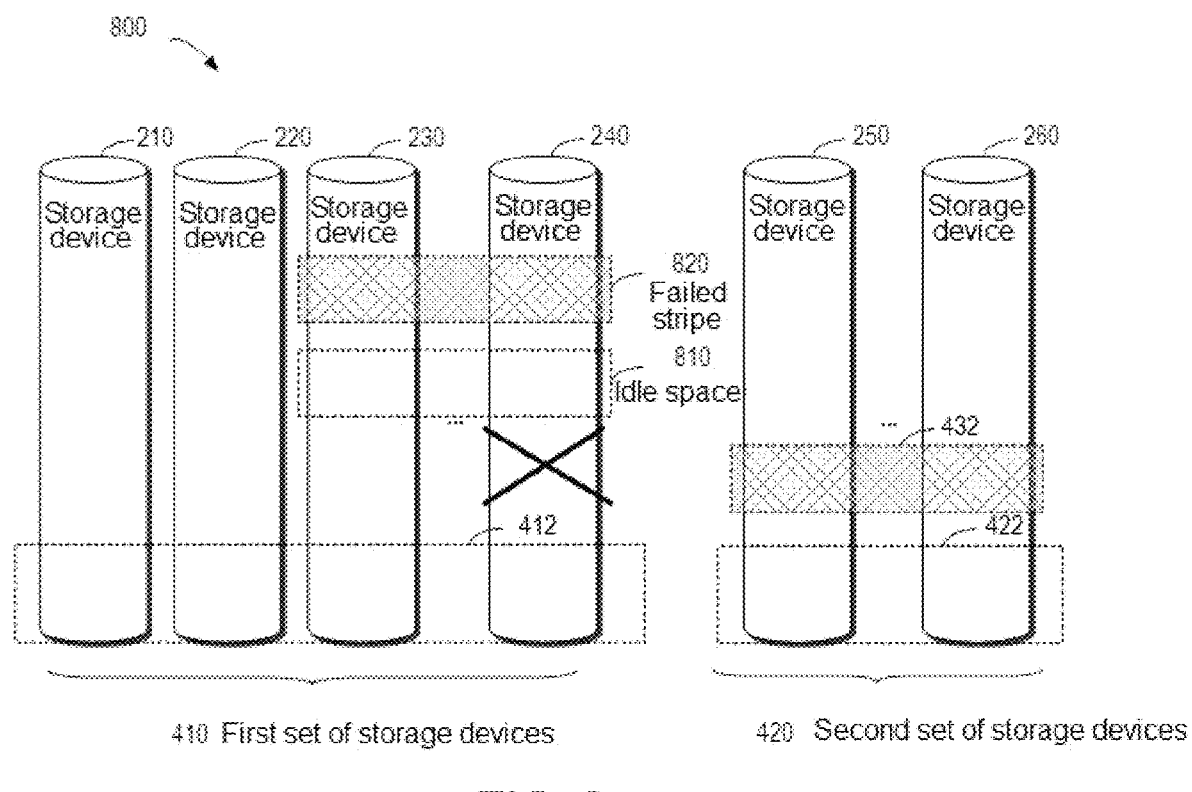
FIG. 8 schematically shows a block diagram of a process for releasing a failed stripe according to one implementation of the present disclosure.

Specifically, the process of releasing failed stripe 430 is described with reference to FIG. 8. FIG. 8 schematically shows block diagram 800 of a process for releasing a failed stripe according to one implementation of the present disclosure. As shown in FIG. 8, by updating the address mapping, the storage space originally occupied by the failed stripe has been marked as idle space 810. In this case, idle space 810 spans storage devices 230, . . . , and 240, and although storage device 240 is still in a failed state at this moment, extents in idle space 810 located in normal storage device 230 and the like are an available idle space.

According to an example implementation of the present disclosure, idle space 810 obtained after the release operation may be used to reconstruct other failed stripes in the first set of storage devices 410. According to an example implementation of the present disclosure, another failed stripe 820 may be determined in the first set of storage devices 410. In this case, there is idle space 810 in the first set of storage devices 410, and idle space 810 is sufficient to reconstruct failed stripe 820. An idle extent in idle space 810 (e.g., an idle extent located in storage device 230) may be used as a reconstruction destination of a failed extent in failed stripe 820.

It will be understood that, in a 4D+1P storage system, one failed stripe includes five extents, in which four normal idle extents other than the failed extent located in failed storage device 240 may be released. Therefore, the obtained four idle extents can be used to respectively reconstruct four failed stripes. When the released idle space 810 is depleted, if there is still a failed extent that has not been reconstructed in the first set of storage devices 410, the method described above may be performed again so as to reconstruct the failed extent to the second set of storage devices 420. With an example implementation of the present disclosure, a reconstruction operation across different sets of storage devices not only may achieve the purpose of reconstruction, but also may release storage spaces from the first set of storage devices 410 that lacks idle spaces. In this way, the subsequent reconstruction operation in the first set of storage devices 410 can be facilitated.

Figure 9:
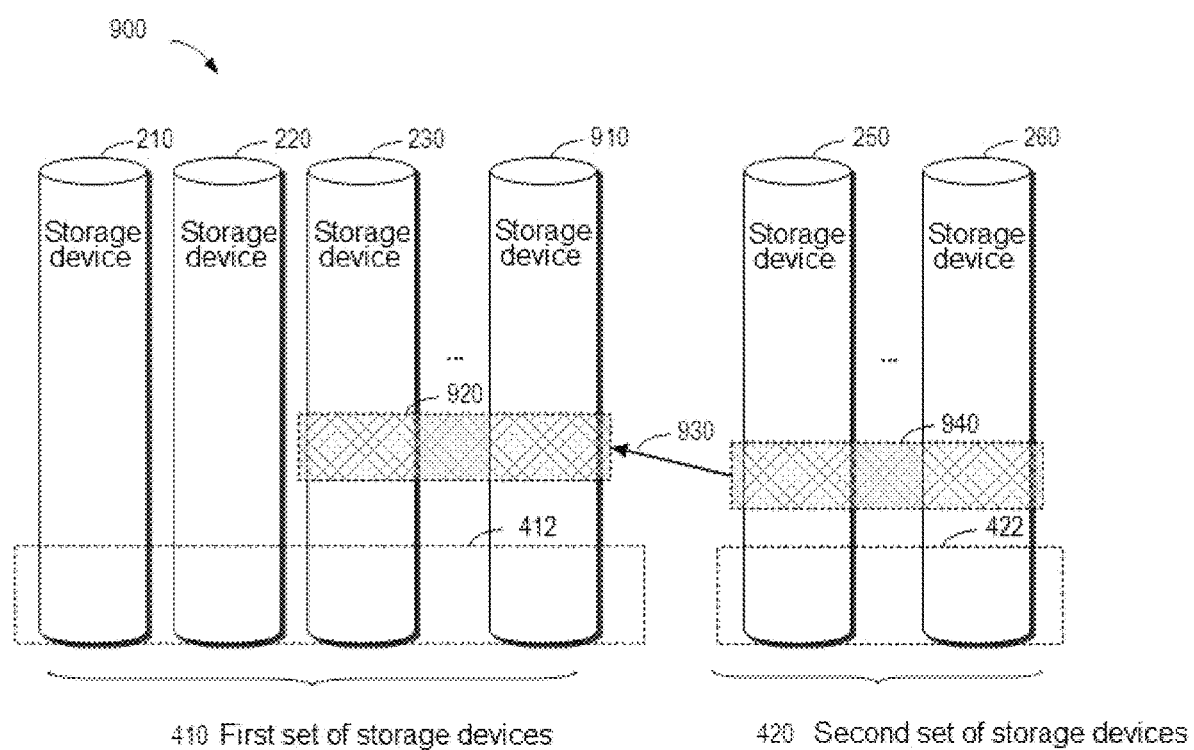
FIG. 9 schematically shows a block diagram of a process for migrating a reconstructed stripe from a second set of storage devices to a first set of storage devices according to one implementation of the present disclosure.

According to an example implementation of the present disclosure, failed storage device 240 in the first set of storage devices 410 may be replaced. In this case, the first set of storage devices 410 have returned to normal, and a reconstructed stripe that has been reconstructed to the second set of storage devices 420 may be migrated back to the first set of storage devices 410. Specifically, FIG. 9 schematically shows block diagram 900 of a process for migrating a reconstructed stripe from a second set of storage devices 420 to a first set of storage devices 410 according to one implementation of the present disclosure. As shown in FIG. 9, failed storage device 240 has been replaced with normal storage device 910, and in this case, reconstructed stripe 940 reconstructed from the first set of storage devices 410 may be looked up in the second set of storage devices 420. Then, as indicated by arrow 930, data in reconstructed stripe 940 may be migrated back to the first set of storage devices 410 from the second set of storage devices 420.

The migration process may be performed based on an existing stripe migration method. For example, it is possible to arbitrarily select five storage devices from storage devices 210, 220, 230, . . . , and 910, and select an idle extent from each storage device respectively. Then, data in the extents in reconstructed stripe 940 may be respectively copied to the selected idle extents to form stripe 920. After the migration operation ends, the extents in reconstructed stripe 940 may be released. It will be understood that because most of the user's data is in the first set of storage devices 410 and accessing the data in reconstructed stripe 940 across sets may cause a certain delay, migrating reconstructed stripe 940 back to the first set of storage devices 410 (as indicated by arrow 930) can ensure that the user's data is collectively stored in the first set of storage devices 410 and improve data access efficiency.

It will be understood that the above only schematically shows a case where a storage system includes a first set of storage devices 410 and a second set of storage devices 420. According to an example implementation of the present disclosure, the storage system may include more sets of storage devices. Assuming that the storage system includes four sets of storage devices, when there is insufficient idle space in the first set of storage devices, a failed stripe in the first set of storage devices 410 may be reconstructed to any set of storage devices among the second, the third, and the fourth set of storage devices. With an example implementation of the present disclosure, idle spaces in an application system may be shared among various sets of storage devices, thereby improving the overall operating efficiency of the storage system.

It will be understood that the above only schematically shows the operations in a 4D+1P RAID storage system. According to an example implementation of the present disclosure, the method described above may also be performed in RAID of other levels. For example, in a 4D+1P+1Q RAID storage system, there may be two storage devices failing allowed at most. The management method described above may be used when one or two storage devices fail. Similarly, the management method described above may also be used in a triple-parity storage system.

Examples of the method according to the present disclosure have been described in detail above with reference to FIGS. 2 to 9, and the implementation of a corresponding device will be described below. According to an example implementation of the present disclosure, an apparatus for managing stripes in a storage system is provided. The apparatus includes: a failed stripe determination module configured for determining, based on a determination that a failed storage device appears in a first set of storage devices in the storage system, a failed stripe involving the failed storage device, the first set of storage devices being storage devices in a first redundant array of independent disks; an idle space determination module configured for determining, in the first set of storage devices, an idle space that can be used to reconstruct the failed stripe; a reconstruction module configured for reconstructing the failed stripe to a second set of storage devices in the storage system based on a determination that the idle space is insufficient to reconstruct the failed stripe, the second set of storage devices being storage devices in a second redundant array of independent disks; and a release module configured for releasing an extent in the failed stripe in the first set of storage devices. It will be understood that the apparatus here may further include more modules configured for implementing the steps of the methods described above, which will not be repeated herein.

Figure 10:
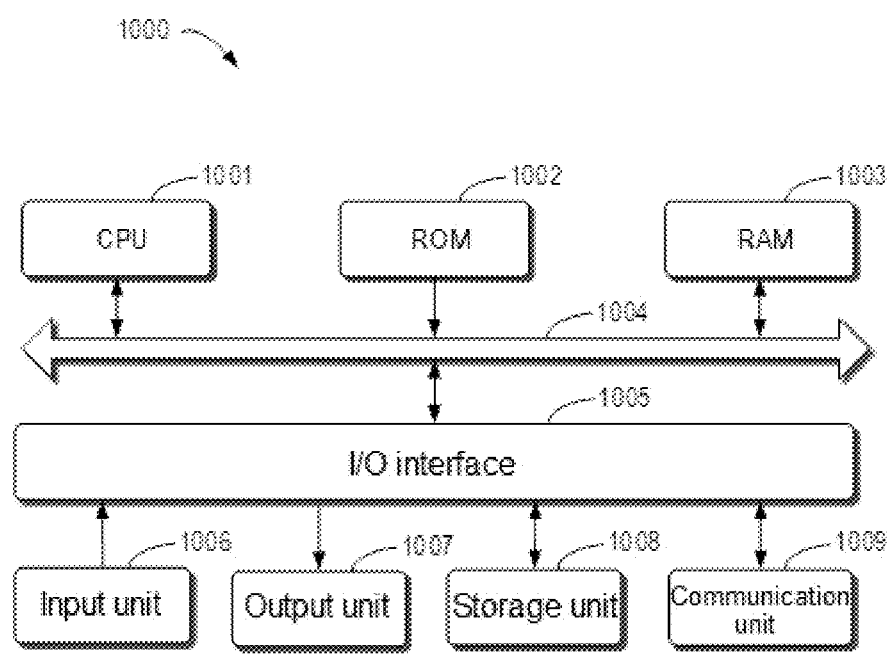
FIG. 10 schematically shows a block diagram of a device for managing stripes in a storage system according to an example implementation of the present disclosure.

FIG. 10 schematically shows a block diagram of device 1000 for managing a storage system according to an example implementation of the present disclosure. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 can also be stored. CPU 1001, ROM 1002, and RAM 1003 are connected to each other via bus 1004. Input/output (I/O) interface 1005 is also connected to bus 1004.

A plurality of components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks.

The processes and processing described above, such as method 500, may be performed by processing unit 1001. For example, in some implementations, method 500 may be implemented as a computer software program that is tangibly contained in a machine-readable medium, such as storage unit 1008. In some implementations, some or all of the computer program may be loaded and/or installed onto device 1000 via ROM 1002 and/or communication unit 1009. When the computer program is loaded to RAM 1003 and executed by CPU 1001, one or more steps of method 500 described above may be performed. Alternatively, in other implementations, CPU 1001 may also be configured in any other suitable manner to implement the above-mentioned processes/methods.

According to an example implementation of the present disclosure, an electronic device is provided, including: at least one processor; and a memory coupled to the at least one processor and having instructions stored therein, wherein the instructions, when executed by the at least one processor, cause the electronic device to perform actions for managing stripes in a storage system. The actions include: based on a determination that a failed storage device appears in a first set of storage devices in the storage system, determining a failed stripe involving the failed storage device, the first set of storage devices being storage devices in a first redundant array of independent disks; determining, in the first set of storage devices, an idle space that can be used to reconstruct the failed stripe; reconstructing the failed stripe to a second set of storage devices in the storage system based on a determination that the idle space is insufficient to reconstruct the failed stripe, the second set of storage devices being storage devices in a second redundant array of independent disks; and releasing an extent in the failed stripe in the first set of storage devices.

According to an example implementation of the present disclosure, determining a failed stripe includes: looking up a metadata extent of a metadata type in a plurality of extents in a failed storage device; and identifying a stripe where the metadata extent is located as a failed stripe.

According to an example implementation of the present disclosure, determining a failed stripe further includes: looking up a user data extent of a user data type in the plurality of extents in the failed storage device; and identifying a stripe where the user data extent is located as a failed stripe.

According to an example implementation of the present disclosure, looking up a user data extent includes: looking up a user data extent after all metadata extents in the failed stripe have been found.

According to an example implementation of the present disclosure, determining an idle space includes: determining the device type of a plurality of storage devices where the failed stripe is located; and determining the idle space from a plurality of storage devices of the device type that are other than the plurality of storage devices in the first set of storage devices.

According to an example implementation of the present disclosure, reconstructing the failed stripe to a second set of storage devices includes: selecting, in the second set of storage devices, a plurality of storage devices of the device type according to the width of the failed stripe; reconstructing the failed stripe to a plurality of idle extents located respectively in the plurality of selected storage devices; and updating address mapping of the first set of storage devices based on addresses of the plurality of idle extents.

According to an example implementation of the present disclosure, reconstructing the failed stripe to a plurality of idle extents includes: respectively copying data in a plurality of extents other than the failed extent in the failed stripe to a plurality of idle extents respectively located in a first part of storage devices of the plurality of storage devices; and reconstructing, based on the copied data in the first part of storage devices, data in the failed extent to idle extents in a second part of storage devices of the plurality of storage devices.

According to an example implementation of the present disclosure, releasing an extent in the failed stripe includes: updating the address mapping of the first set of storage devices to mark the extent in the failed stripe as an idle extent.

According to an example implementation of the present disclosure, the actions further include: determining another failed stripe in the first set of storage devices; determining, in the first set of storage devices, an idle space that can be used to reconstruct the another failed stripe; and reconstructing a failed extent in the another failed stripe to an idle extent in the idle space based on a determination that the idle space is sufficient to reconstruct the another failed stripe.

According to an example implementation of the present disclosure, the actions further include: determining, in the second set of storage devices, a reconstructed stripe reconstructed from the first set of storage devices in response to a determination that the failed storage device is replaced with a normal storage device; and migrating the reconstructed stripe from the second set of storage devices to the first set of storage devices.

According to an example implementation of the present disclosure, a computer program product is provided. The computer program product is tangibly stored on a non-transitory computer-readable medium and containing machine-executable instructions for performing the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for implementing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a protruding structure in a groove on which instructions are stored, and any appropriate combination of the above. The computer-readable storage medium as used herein is not explained as transient signals themselves, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to each computing/processing device, or downloaded to an external computer or an external storage unit over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

Computer program instructions for performing operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In the case where a remote computer is involved, the remote computer can be connected to a user's computer over any kind of networks, including a local area network (LAN) or a wide area network (WAN), or can be connected to an external computer (e.g., connected over the Internet using an Internet service provider). In some implementations, an electronic circuit (for example, a programmable logic circuit, a field-programmable gate array (FPGA), or a programmable logic array (PLA)) is customized by using state information of computer-readable program instructions. The electronic circuit may execute the computer-readable program instructions to implement various aspects of the present disclosure. Various aspects of the present disclosure are described here with reference to flowcharts and/or block diagrams of the method, the apparatus (the system), and the computer program product implemented according to the present disclosure. It should be understood that each block in the flowcharts and/or block diagrams and combinations of the blocks in the flowcharts and/or block diagrams can be implemented by computer-readable program instructions.

These computer-readable program instructions can be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing the functions/actions specified in one or more blocks in the flowcharts and/or block diagrams is produced. The computer-readable program instructions may also be stored in the computer-readable storage medium. The instructions enable a computer, a programmable data processing apparatus, and/or another device to operate in a specific manner, so that the computer-readable medium storing the instructions includes an article of manufacture that includes instructions for implementing various aspects of functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show architectures, functions, and operations of possible implementations of the system, the method, and the computer program product according to a plurality of implementations of the present disclosure. In this regard, each block in the flowcharts or block diagrams may represent a module, a program segment, or part of instructions, which contains one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to various implementations disclosed. Many modifications and variations will be apparent to a person of ordinary skill in the art without departing from the scope and spirit of the various implementations illustrated. The terms used herein are chosen to best explain the principles and practical applications of the various implementations or the improvements to technologies in the market, or to enable another person of ordinary skill in the art to understand the implementations disclosed herein.

The invention claimed is:

1. A method for managing stripes in a storage system, the method comprising:
    determining, based on a determination that a failed storage device appears in a first set of storage devices in the storage system, a failed stripe involving the failed storage device, the first set of storage devices being storage devices in a first redundant array of independent disks;
    determining, in the first set of storage devices, an idle space that can be used to reconstruct the failed stripe;
    reconstructing the failed stripe to a second set of storage devices in the storage system based on a determination that the idle space is insufficient to reconstruct the failed stripe, the second set of storage devices being storage devices in a second redundant array of independent disks; and
    releasing an extent in the failed stripe in the first set of storage devices.

2. The method according to claim 1, wherein determining the failed stripe comprises:
    looking up a metadata extent of a metadata type in a plurality of extents in the failed storage device; and
    identifying a stripe where the metadata extent is located as the failed stripe.

3. The method according to claim 2, wherein determining the failed stripe further comprises:
    looking up a user data extent of a user data type in the plurality of extents in the failed storage device; and
    identifying a stripe where the user data extent is located as the failed stripe.

4. The method according to claim 3, wherein looking up the user data extent comprises:
    looking up the user data extent after all metadata extents in the failed stripe have been found.

5. The method according to claim 1, wherein determining the idle space comprises:
    determining the device type of a plurality of storage devices where the failed stripe is located; and
    determining the idle space from a plurality of storage devices of the device type that are other than the plurality of storage devices in the first set of storage devices.

6. The method according to claim 5, wherein reconstructing the failed stripe to the second set of storage devices comprises:
selecting, in the second set of storage devices, a plurality of storage devices of the device type according to a width of the failed stripe;
reconstructing the failed stripe to a plurality of idle extents respectively located in the plurality of selected storage devices; and
updating address mapping of the first set of storage devices based on addresses of the plurality of idle extents.

7. The method according to claim 6, wherein reconstructing the failed stripe to the plurality of idle extents comprises:
respectively copying data in a plurality of extents other than the failed extent in the failed stripe to a plurality of idle extents respectively located in a first part of storage devices of the plurality of storage devices; and
reconstructing, based on the copied data in the first part of storage devices, data in the failed extent to idle extents in a second part of storage devices of the plurality of storage devices.

8. The method according to claim 1, wherein releasing an extent in the failed stripe comprises: updating address mapping of the first set of storage devices to mark the extent in the failed stripe as an idle extent.

9. The method according to claim 8, further comprising:
determining another failed stripe in the first set of storage devices;
determining, in the first set of storage devices, an idle space that can be used to reconstruct the another failed stripe; and
reconstructing a failed extent in the another failed stripe to an idle extent in the idle space based on a determination that the idle space is sufficient to reconstruct the another failed stripe.

10. The method according to claim 1, further comprising:
determining, in the second set of storage devices, a reconstructed stripe reconstructed from the first set of storage devices in response to a determination that the failed storage device is replaced with a normal storage device; and
migrating the reconstructed stripe from the second set of storage devices to the first set of storage devices.

11. An electronic device, comprising:
at least one processor; and
a memory coupled to the at least one processor and having instructions stored therein, wherein the instructions, when executed by the at least one processor, cause the electronic device to perform actions for managing stripes in a storage system, and the actions comprise:
determining, based on a determination that a failed storage device appears in a first set of storage devices in the storage system, a failed stripe involving the failed storage device, the first set of storage devices being storage devices in a first redundant array of independent disks;
determining, in the first set of storage devices, an idle space that can be used to reconstruct the failed stripe;
reconstructing the failed stripe to a second set of storage devices in the storage system based on a determination that the idle space is insufficient to reconstruct the failed stripe, the second set of storage devices being storage devices in a second redundant array of independent disks; and
releasing an extent in the failed stripe in the first set of storage devices.

12. The device according to claim 11, wherein determining the failed stripe comprises:
looking up a metadata extent of a metadata type in a plurality of extents in the failed storage device; and
identifying a stripe where the metadata extent is located as the failed stripe.

13. The device according to claim 12, wherein determining the failed stripe further comprises:
looking up a user data extent of a user data type in the plurality of extents in the failed storage device; and
identifying a stripe where the user data extent is located as the failed stripe.

14. The device according to claim 13, wherein looking up the user data extent comprises:
looking up the user data extent after all metadata extents in the failed stripe have been found.

15. The device according to claim 11, wherein determining the idle space comprises:
determining the device type of a plurality of storage devices where the failed stripe is located; and
determining the idle space from a plurality of storage devices of the device type that are other than the plurality of storage devices in the first set of storage devices.

16. The device according to claim 15, wherein reconstructing the failed stripe to the second set of storage devices comprises:
selecting, in the second set of storage devices, a plurality of storage devices of the device type according to a width of the failed stripe;
reconstructing the failed stripe to a plurality of idle extents respectively located in the plurality of selected storage devices; and
updating address mapping of the first set of storage devices based on addresses of the plurality of idle extents.

17. The device according to claim 16, wherein reconstructing the failed stripe to the plurality of idle extents comprises:
respectively copying data in a plurality of extents other than the failed extent in the failed stripe to a plurality of idle extents respectively located in a first part of storage devices of the plurality of storage devices; and
reconstructing, based on the copied data in the first part of storage devices, data in the failed extent to idle extents in a second part of storage devices of the plurality of storage devices.

18. The device according to claim 11, wherein releasing an extent in the failed stripe comprises: updating address mapping of the first set of storage devices to mark the extent in the failed stripe as an idle extent.

19. The device according to claim 18, wherein the actions further comprise:
determining another failed stripe in the first set of storage devices;
determining, in the first set of storage devices, an idle space that can be used to reconstruct the another failed stripe; and
reconstructing a failed extent in the another failed stripe to an idle extent in the idle space based on a determination that the idle space is sufficient to reconstruct the another failed stripe.

20. A computer program product having a non-transitory computer readable medium which stores a set of instructions to manage stripes in a storage system; the set of instructions, when carried out by computerized circuitry, causing the computerized circuitry to perform a method of:

determining, based on a determination that a failed storage device appears in a first set of storage devices in the storage system, a failed stripe involving the failed storage device, the first set of storage devices being storage devices in a first redundant array of independent disks;

determining, in the first set of storage devices, an idle space that can be used to reconstruct the failed stripe;

reconstructing the failed stripe to a second set of storage devices in the storage system based on a determination that the idle space is insufficient to reconstruct the failed stripe, the second set of storage devices being storage devices in a second redundant array of independent disks; and releasing an extent in the failed stripe in the first set of storage devices.

* * * * *